United States Patent
Fujishiro (10) Patent No.: US 11,723,083 B2
(45) Date of Patent: Aug. 8, 2023

(54) RADIO TERMINAL AND METHOD (71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 118 days.

(21) Appl. No.: 17/159,135

(22) Filed: Jan. 26, 2021

(65) Prior Publication Data
US 2021/0153264 A1 May 20, 2021

Related U.S. Application Data (63) Continuation of application No. PCT/JP2019/029096, filed on Jul. 24, 2019.

(30) Foreign Application Priority Data

Jul. 26, 2018 (JP) ................................. 2018-140422

(51) Int. Cl.
*H04W 76/10* (2018.01)
*H04W 4/70* (2018.01)
*H04W 48/16* (2009.01)
*H04W 68/00* (2009.01)

(52) U.S. Cl.
CPC ............. *H04W 76/10* (2018.02); *H04W 4/70* (2018.02); *H04W 48/16* (2013.01); *H04W 68/005* (2013.01)

(58) Field of Classification Search
CPC ......... H04W 76/10; H04W 4/70; H04W 4/06; H04W 24/02; H04W 88/02; H04W 76/18; H04W 76/27; H04W 72/04; H04W 72/0446; H04W 48/08; H04W 48/06; H04W 74/0833; H04W 76/19; H04W 24/04; H04W 76/25; H04W 28/0289; H04W 28/06; H04W 28/08; H04W 68/02
See application file for complete search history.

(56) References Cited

U.S. PATENT DOCUMENTS

| | | | |
|---|---|---|---|
| 2011/0274040 A1* | 11/2011 | Pani ......................... | H04W 4/70 370/328 |
| 2013/0279482 A1* | 10/2013 | Sundberg .......... | H04W 56/0045 370/336 |
| 2016/0182286 A1* | 6/2016 | Lundén ................ | H04W 28/12 370/254 |
| 2016/0302234 A1* | 10/2016 | Martinez Tarradell ... | H04L 1/08 |
| 2021/0368475 A1* | 11/2021 | Liu ........................ | H04W 68/02 |

FOREIGN PATENT DOCUMENTS

| | | |
|---|---|---|
| JP | 2016115999 A | 6/2016 |
| WO | 2016152307 A1 | 9/2016 |

OTHER PUBLICATIONS

ERICSSON; "Scope of Rel-16 LTE-MTC"; 3GPP TSG RAN Meeting #80; RP-181186; Jun. 11-14, 2018; http://www.3gpp.org/ftp/tsg_Ran/tsg_Ran/TSGR_80/Docs/RP-181186.zip; pp. 1-7; La Jolla, USA.

* cited by examiner

*Primary Examiner* — Christopher M Brandt (74) *Attorney, Agent, or Firm* — Studebaker & Brackett PC (57) ABSTRACT

A UE comprises: a controller configured to determine a timing of making a connection request to the base station when there is a need to start communication with the base station while the UE is in a RRC idle state; and a transmitter configured to transmit a connection request signal to the base station at the determined timing. The controller is configured to determine the timing using an identifier allocated to the radio terminal.

13 Claims, 6 Drawing Sheets

RADIO TERMINAL AND METHOD

RELATED APPLICATIONS

The present application is a continuation based on PCT Application No. PCT/JP2019/029096, filed on Jul. 24, 2019, which claims the benefit of Japanese Patent Application No. 2018-140422 filed on Jul. 26, 2018. The content of which is incorporated by reference herein in their entirety.

TECHNICAL FIELD

The present invention relates to a radio terminal and a method used for a mobile communication system.

BACKGROUND ART

In a mobile communication system conforming to the 3GPP (3rd Generation Partnership Project) standard, a radio terminal transmits a connection request signal to a base station when data to be transmitted to the base station is generated in a standby state called an RRC idle mode.

With the development in IoT (Internet of Things) technologies in recent years, radio terminals for machine type communication are expected to rapidly increase in future. Against this background, it is desired that connection request timings at multiple radio terminals be distributed so that burden caused by transmission and reception of connection request signals will not increase abruptly (see Non Patent Literature 1).

CITATION LIST

Non Patent Literature

Non Patent Literature 1: 3GPP Contribution, "RP-181186", "Scope of Rel-16 LTE-MTC", [online], [searched on Jun. 18, 2018], the Internet <http://www.3gpp.org/ftp/tsg_Ran/tsg_Ran/TSGR_80/Docs/RP-181186.zip>

SUMMARY

A radio terminal according to a first feature is configured to perform communication with a base station. The radio terminal comprises: a controller configured to determine a timing of making a connection request to the base station when there is a need to start communication with the base station while the radio terminal is in a standby state; and a transmitter configured to transmit a connection request signal to the base station at the determined timing. The controller is configured to determine the timing using an identifier allocated to the radio terminal.

A method according to a second feature is a method in a radio terminal configured to perform communication with a base station. The method comprises: determining a timing of making a connection request to the base station when there is a need to start communication with the base station while the radio terminal is in a standby state; and transmitting a connection request signal to the base station at the determined timing. The determining the timing includes determining the timing using an identifier allocated to the radio terminal.

A processor according to a second feature controls a radio terminal configured to perform communication with a base station. The processor is configured to execute: a process of determining a timing of making a connection request to the base station when there is a need to start communication with the base station while the radio terminal is in a standby state; and a process of transmitting a connection request signal to the base station at the determined timing. The process of determining the timing includes a process of determining the timing using an identifier allocated to the radio terminal.

DESCRIPTION OF EMBODIMENT

A mobile communications system according to one embodiment will be described with reference to the drawings. In the description of the drawings hereinbelow, the same or similar reference numerals are assigned to the same or similar parts.

(Mobile Communications System)

Figure 1:
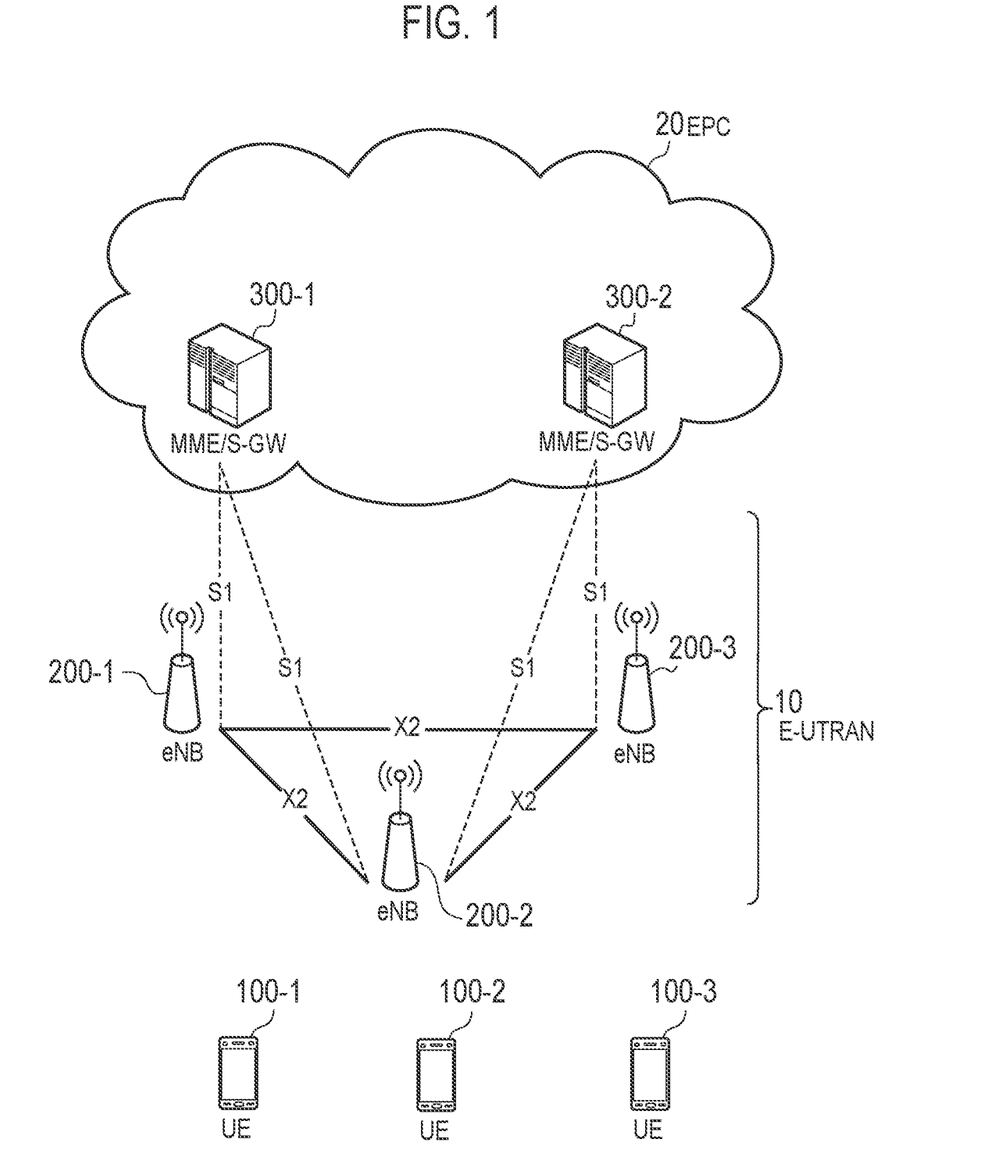
FIG. 1 is a diagram illustrating a configuration of an mobile communications system according to an embodiment.

The configuration of a mobile communications system according to the present embodiment will be described. FIG. 1 is a diagram illustrating a configuration of an LTE (Long Term Evolution) system which is the mobile communications system according to the present embodiment. The LTE system is a mobile communications system based on the 3GPP standard. However, the system is not limited to the LTE system, and may be an NR system which is a fifth generation (5G) mobile communication system based on the 3GPP standard.

As shown in FIG. 1, a mobile communications system according to the present embodiment is provided with a radio terminal (user equipment: UE) 100, a radio access network (evolved-UMTS terrestrial radio access network E-:UTRAN) 10, and a core network (evolved packet core: EPC) 20.

The UE 100 is a mobile-type communication apparatus. The UE 100 performs radio communications with an eNB 200 that manages the cell (serving cell) in which the UE 100 exists. The UE 100 may be any device as long as it is a device that performs radio communication with the eNB 200. For example, the UE 100 is a mobile phone terminal, a tablet terminal, a notebook PC, a sensor, a device installed in the sensor, a vehicle, or a device installed in vehicle.

The E-UTRAN 10 includes base stations (evolved Node-B: eNB) 200. The eNB 200 are interconnected via an X2 interface. The eNB 200 manage one or a plurality of cells. The eNB 200 perform radio communications with the UEs 100 that have established a connection with their own cells. The eNB 200 have a radio resource management (RRM) function, a user data (hereinafter suitably called "data") routing function, and a measurement control function for mobility control and scheduling, and the like. "Cell" is used as a term indicating the smallest unit of a radio communications area. "Cell" is also used as a term indicating a function or resource that performs radio communications with the UE 100. One cell belongs to one carrier frequency.

The EPC 20 includes a mobility management entity (MME) and serving gateway (S-GW) 300. The MME performs various mobility control with respect to the UE 100, and the like. The MME manages information of a tracking area (TA) in which the UE 100 exists by using non-access stratum (NAS) signaling to communicate with the UE 100. The tracking area is an area comprising a plurality of cells. The S-GW performs data transfer control. The MME and S-GW are connected to the eNB 200 via an S1 interface.

Figure 2:
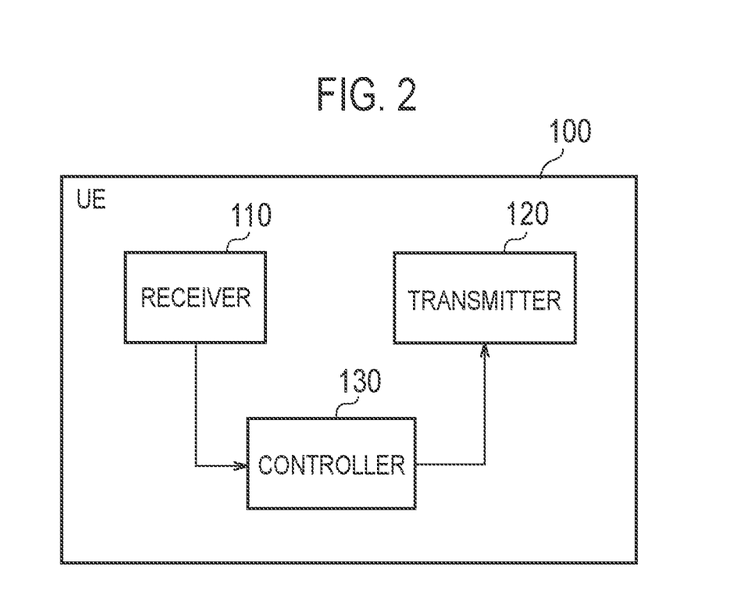
FIG. 2 is a diagram illustrating a configuration of a UE (radio terminal) according to the embodiment.

FIG. 2 is a diagram illustrating a configuration of the UE 100 (radio terminal) according to the present embodiment. As shown in FIG. 2, the UE 100 is provided with a receiver 110, a transmitter 120, and a controller 130.

The receiver 110 performs various reception under the control of the controller 130. The receiver 110 includes an antenna and a receiving set. The receiving set converts a radio signal received by the antenna to a baseband signal (reception signal) and outputs the baseband signal to the controller 130.

The transmitter 120 performs various transmission under the control of the controller 130. The transmitter 120 includes an antenna and a transmitting set. The transmitting set converts the baseband signal (transmission signal) output by the controller 130 to a radio signal and transmits the radio signal from the antenna.

The controller 130 performs various control of the UE 100. The controller 130 includes at least one processor and one memory. The memory stores a program executed by the processor and information used in processing by the processor. The processor may include a baseband processor and a central processing unit (CPU). The baseband processor performs modulation/demodulation and coding/decoding of baseband signals, and the like. The CPU performs various processing by executing the program stored in the memory. The processor executes processing that will be described subsequently.

Figure 3:
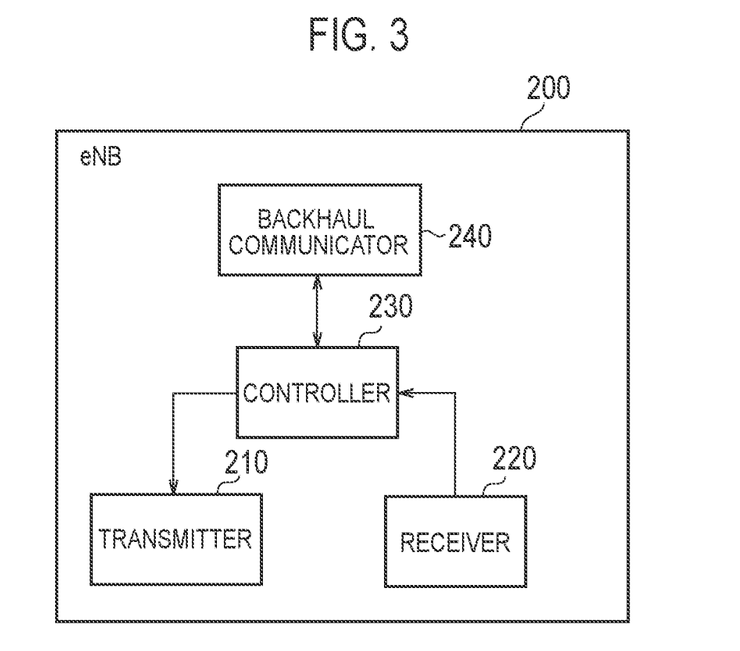
FIG. 3 is a diagram illustrating a configuration of an eNB (base station) according to the embodiment.

FIG. 3 is a diagram illustrating a configuration of the eNB 200 (base station) according to the present embodiment. As shown in FIG. 3, the eNB 200 is provided with a transmitter 210, a receiver 220, a controller 230, and a backhaul communicator 240.

The transmitter 210 performs various transmission under the control of the controller 230. The transmitter 210 includes an antenna and a transmitting set. The transmitting set converts the baseband signal (transmission signal) output by the controller 230 to a radio signal and transmits the radio signal from the antenna.

The receiver 220 performs various receptions under the control of the controller 230. The receiver 220 includes an antenna and a receiving device. The receiving device converts a radio signal received by the antenna into a baseband signal (received signal) and outputs the baseband signal to the controller 230.

The controller 230 performs various controls in the eNB 200. The controller 230 includes at least one processor and memory. The memory stores a program executed by the processor and information used for processing by the processor. The processor may include a baseband processor and a CPU. The baseband processor performs modulation/demodulation, encoding/decoding, and the like of the baseband signal. The CPU performs a variety of processing by executing programs stored in the memory. The processor executes processing to be described later.

The backhaul communicator 240 is connected to an adjacent eNB via an X2 interface. The backhaul communicator 240 is connected to an MME/S-GW 300 via an S1 interface. The backhaul communicator 240 is used for communication performed on the X2 interface, communication performed on the S1 interface, and the like.

Figure 4:
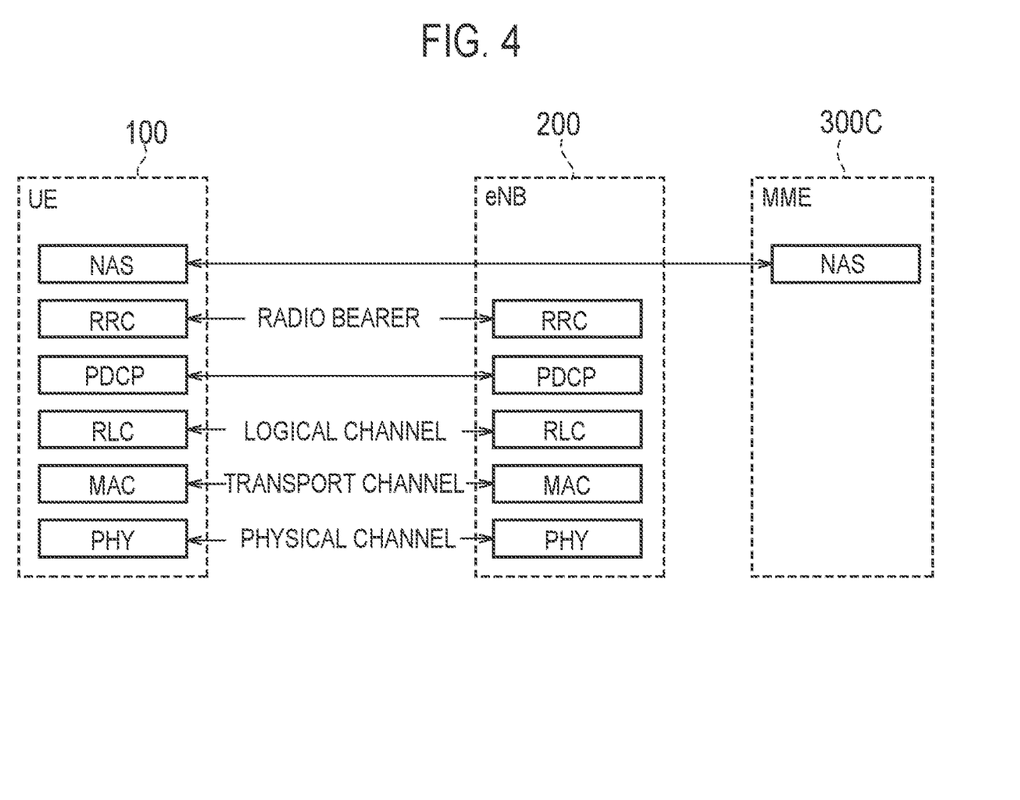
FIG. 4 is a diagram illustrating a protocol stack of a radio interface in an LTE system.

FIG. 4 is a diagram illustrating a configuration of a protocol stack of a radio interface in the LTE system. As illustrated in FIG. 4, a radio interface protocol is divided into a first layer to a third layer of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs data priority control, retransmission processing using hybrid ARQ (HARQ), and random access procedures, and the like. Data and control information are transmitted between the MAC layer of the UE 100 and the MAC layer of the eNB 200 via a transport channel. The MAC layer of the eNB 200 includes a scheduler. The scheduler determines the transport format (transport block size, modulation/coding system (MCS)) of uplinks and downlinks, and the resource blocks allocated to the UE 100.

The RLC layer uses the functions of the MAC layer and PHY layer to transmit data to the RLC layer on the receiving side. Data and control information are transmitted between the RLC layer of the UE 100 and the RLC layer of the eNB 200 via a logical channel.

The PDCP layer performs header compression/extension and encryption/decoding.

The RRC layer is defined only by a control plane that handles the control information. RRC signaling for various configuration is transmitted between the RRC layer of the UE 100 and the RRC layer of the eNB 200. The RRC layer controls the logical channel, transport channel, and physical channel according to the establishment, re-establishment, and release of a radio bearer. If there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode. The RRC connected mode is an example of a connected state, and the RRC idle mode is an example of a standby state.

A NAS layer, which is located on top of the RRC layer, performs session management and mobility management, and the like. NAS signaling is transmitted between the NAS layer of the UE 100 and the NAS layer of an MME 300C. Besides a radio interface protocol, the UE 100 has an application layer function or another such function.

Figure 5:
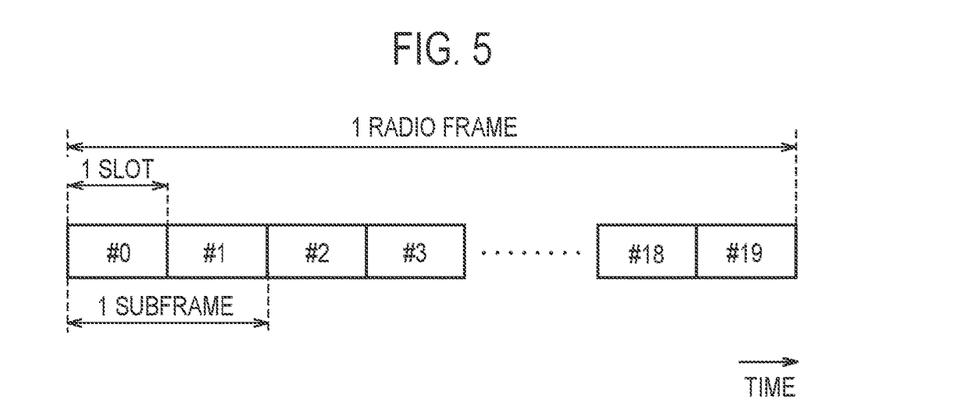
FIG. 5 is diagram illustrating a configuration of a radio frame used in an LTE system.

FIG. 5 is a diagram illustrating a configuration of a radio frame used in an LTE system. As shown in FIG. 5, the radio frame is configured from ten subframes on a time axis. The subframes are each configured from two slots on the time axis. The length of each subframe is 1 ms. The length of each slot is 0.5 ms. Each subframe contains a plurality of resource blocks (RB) on a frequency axis. Each subframe contains a plurality of symbols on the time axis. Each resource block contains a plurality of subcarriers on the frequency axis. More specifically, one RB is configured from twelve subcarriers and one slot. One resource element (RE) is configured from one symbol and one subcarrier. Among the radio resources (time/frequency resources) allocated to the UE 100, the frequency resources can be specified by means of resource blocks and the time resources can be specified by means of subframes (or slots).

In a downlink, an interval of the first few symbols of each subframe is a region mainly used as a physical downlink control channel (PDCCH) for transmitting downlink control information. The remainder of each subframe is a region that can be used mainly as a physical downlink shared channel (PDSCH) for transmitting downlink data.

In an uplink, both ends in the frequency direction of each subframe are regions which are mainly used as a physical uplink control channel (PUCCH) for transmitting uplink control information. The remainder of each subframe is a region that can be mainly used as a physical uplink shared channel (PUSCH) for transmitting uplink data.

(eMTC and NB-IoT)

In the present embodiment, a scenario is assumed where new-category UEs 100 which are directed toward machine type communication such as MTC and IoT services exist. The new-category UEs 100 are UEs 100 for which transmission/reception bandwidths are restricted only in a portion of the system transmission/reception frequency bands (LTE transmission/reception bandwidths). The new UE categories are called category M1 and category narrow band (NB)-IoT, for example. Category M1 is a category to which enhanced Machine Type Communications (eMTC) UEs belong. Category NB-IoT (category NB1) is a category to which NB-IoT UEs belong. Category M1 restricts the transmission/reception bandwidths of the UEs 100 (eMTC UEs) to 1.08 MHz (that is, a six resource block bandwidth), for example. Category NB-IoT (category NB1) further restricts the transmission/reception bandwidths of the UEs 100 (NB-IoT UE) to 180 kHz (that is, a one resource block bandwidth). By changing to this narrow band, low costs and low power consumption, which are required for eMTC UEs and NB-IoT UEs, can be realized.

Figure 6:
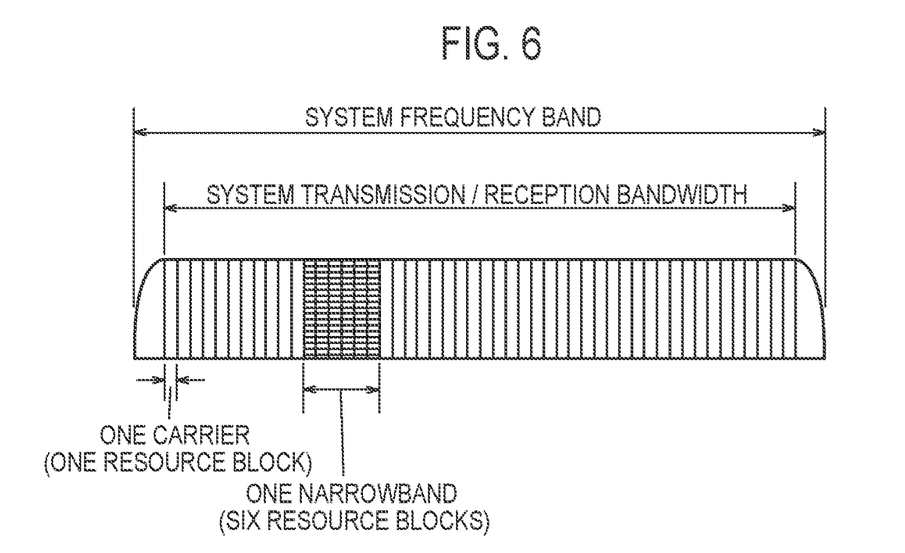
FIG. 6 is a diagram illustrating a frequency channel handled by an eMTC UE and an NB-IoT UE.

FIG. 6 is a diagram illustrating frequency channels that are handled by eMTC UEs and NB-IoT UEs. As illustrated in FIG. 6, the frequency bandwidth for the system frequency bands of an LTE system can be 10 MHz. The bandwidth of the system transmission/reception bands is 50 resource blocks=9 MHz, for example. The bandwidth of a frequency channel with which an eMTC UE is compatible is equal to or less than six resource blocks=1.08 MHz. A frequency channel of no more than six resource blocks with which an eMTC UE is compatible is called "narrowband (NB)". The bandwidth of a frequency channel with which an NB-IoT UE is compatible is one resource block=180 kHz. A single resource block frequency channel with which an NB-IoT UE is compatible is called a "carrier."

An eMTC UE is operated in an LTE transmission/reception bandwidth. The NB-IoT UE supports modes operated in an LTE transmission/reception bandwidth, modes operated in a guard band outside the LTE transmission/reception bandwidth, and modes operated in frequency bands dedicated to NB-IoT.

In order to implement expanded coverage, the eMTC UEs and NB-IoT UEs support an enhanced coverage (EC) function which uses repeated transmissions and the like. The enhanced coverage function may also include repeated transmission (repetition) in which the same signal is repeatedly transmitted using a plurality of subframes. The greater the number of repeated transmissions, the more coverage can be expanded.

(Random Access Procedure)

Figure 7:
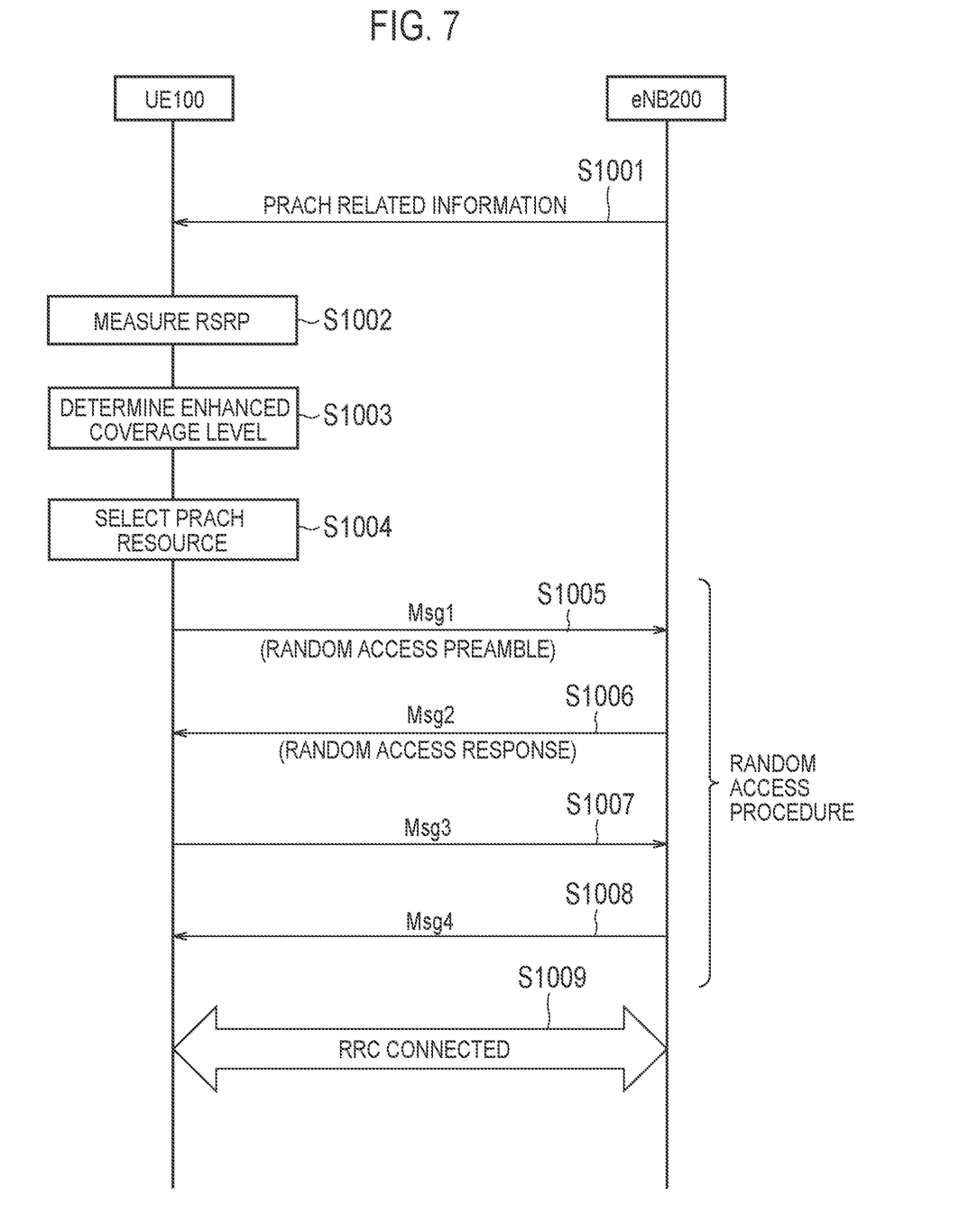
FIG. 7 is a diagram illustrating a general random access procedure for an eMTC UE and an NB-IoT UE.

FIG. 7 is a diagram illustrating a general random access procedure for eMTC UEs and NB-IoT UEs. In an initial state, the UE 100 is in RRC idle mode. The UE 100 executes the random access procedure in order to transition to RRC connected mode. Such a case is called an initial connection (initial access from RRC_IDLE). At the time of an initial connection, a contention-based random access procedure is applied.

As shown in FIG. 7, the UE 100 selects an eNB 200 cell as the serving cell. The UE 100 may also determine that same lies within enhanced coverage if a first cell selection criterion (a first S-criteria) for normal coverage is not satisfied and a second cell selection criterion (a second S-criteria) for enhanced coverage is satisfied. A "UE lying within enhanced coverage" signifies a UE which is required to use an enhanced coverage function (enhanced coverage mode) to access the cell. Note that an eMTC UE must use an enhanced coverage mode. Here, the description will be continued on the assumption that the UE 100 lies within enhanced coverage.

In step S1001, the eNB 200 transmits physical random access channel (PRACH)-related information by means of broadcast signaling (SIB, for example). The PRACH-related information includes various parameters provided for each enhanced coverage level. By way of an example, a total of four levels, namely, enhanced coverage levels 0 to 3, are defined as enhanced coverage levels. The various parameters include a reference signal received power (RSRP) threshold value, PRACH resources, and a maximum preamble transmission count. The PRACH resources include radio resources (time/frequency resources) and a signal sequence (preamble sequence). The UE 100 stores the received PRACH-related information.

In step S1002, the UE 100 measures the RSRP on the basis of a reference signal that is transmitted from the eNB 200.

In step S1003, the UE 100 determines its own enhanced coverage level (CE level) by comparing the measured RSRP with the RSRP threshold value for each enhanced coverage level. The enhanced coverage level indicates the extent of the enhanced coverage required by the UE 100. The enhanced coverage level relates to at least the transmission count (that is, the number of repetitions) for repeated transmissions.

In step S1004, the UE 100 selects the PRACH resource corresponding to its own enhanced coverage level.

Steps S1005 to S1008 constitute the random access procedure. In step S1005, the UE 100 uses the selected PRACH resource to transmit a Msg 1 (random access preamble) to the eNB 200. Note that "Msg" is an abbreviation for message. The eNB 200 specifies the enhanced coverage level of the UE 100 on the basis of the PRACH resource used for the received Msg 1.

In step S1006, the eNB 200 transmits, to the UE 100, Msg2 (random access response) including scheduling information indicating a PUSCH resource allocated to the UE 100. Here, the Msg2 includes a Temporary C-RNTI allocated to the UE 100 by the eNB 200. The Msg2 also includes a timing advance value calculated by the eNB 200 based on a random access preamble. The timing advance value is a transmit timing adjustment value for compensating for a propagation delay of radio signals. Note that the UE 100 can transmit the Msg1 plural times up to the maximum number of times of preamble transmissions corresponding to its own enhanced coverage level until the UE 100 normally receives the Msg2

In step S1007, the UE 100 transmits Msg3 to the eNB 200 based on the scheduling information. The Msg3 may be an RRC connection request message, or may be an RRC connection resume request message. Here, the UE 100 makes a transmit timing adjustment using the timing advance value which was included in the Msg2. The UE 100 also performs scrambling processing using the Temporary C-RNTI which was included in the Msg2.

In step S1008, the eNB 200 transmits Msg4 to the UE 100. The Msg4 may be an RRC connection setup message. Here, the eNB 200 performs scrambling processing of the PDCCH using the Temporary C-RNTI. Specifically, the eNB 200 transmits, via the PDCCH, downlink control information (DCI) with a CRC (Cyclic Redundancy Check) parity bit scrambled with the Temporary C-RNTI, and the UE 100 attempts decoding of the DCI and detects a PDCCH for which a CRC check is successful as the PDCCH intended for itself (so-called blind decoding).

In step S1009, the UE 100 transitions to RRC connected mode in response to receiving Msg 4. Thereupon, the UE 100 may transmit a Msg 5: RRC connection establishment completion (RRC connection setup complete) message to the eNB 200. Thereafter, the eNB 200 controls the repeated transmissions to the UE 100, and the like, on the basis of the specified enhanced coverage level. Having transitioned to the RRC connected mode, the UE 100 continuously uses the Temporary C-RNTI that was included in the Msg2 as the C-RNTI allocated to itself while the UE 100 is in the RRC connected mode.

Operations According to the Embodiment

Operations according to the present embodiment are described. The UE 100 according to the present embodiment may be a UE for machine type communication. A UE for machine type communication refers to a UE that belongs to category M1 or category NB (Narrow Band)-IoT. The category M1 corresponds to an eMTC UE. The category NB-IoT (category NB1) corresponds to an NB-IoT UE.

In the present embodiment, the controller 130 of the UE 100 determines a timing of making a connection request to the eNB 200 when there is a need to start communication with the eNB 200 while the UE 100 is in the RRC idle mode. When there is a need to start communication with the eNB 200 may be when data to be transmitted to the eNB 200 has been generated at the UE 100 or when the UE 100 receives a paging intended for that UE 100 from the eNB 200. The following mainly assumes a case where data to be transmitted to the eNB 200 is generated at the UE 100. Such a case can be referred to as an MO (Mobile Originated) call.

The transmitter 120 of the UE 100 transmits a connection request signal to the eNB 200 at a timing when it determines that there is a need to start communication with the eNB 200. Here, the connection request signal may be Msg 1 (random access preamble) in a random access procedure or Msg3 (RRC Connection Request Message or RRC Connection Resume Request message) in a random access procedure. The following mainly assumes a case where the connection request signal is Msg1 (random access preamble).

The controller 130 of the UE 100 determines the timing of making a connection request using an identifier allocated to that UE 100 so that the timings at which multiple UEs transmit connection request signals to the eNB 200 (referred to as the timing of making a connection request or connection request timing) are distributed. This can reduce the possibility of overlap with the connection request timings of other UEs 100 while ensuring the connection request timing for the UE 100. Thus, connection request timings can be appropriately distributed. In the following, processing for determining the connection request timing so that connection request timings at multiple UEs are distributed may be referred to as "timing distribution processing".

An identifier that is allocated to the UE 100 and is used for the timing distribution processing is one of IMSI (International Mobile Subscriber Identity), Resume ID, S-TMSI (SAE Temporary Mobile Subscriber Identity) and AC (Access Class) or a combination of these identifiers, for example. Note that the UE 100 may use an identifier other than them for the timing distribution processing.

IMSI is an international subscriber identification number which is issued when a user makes a contract with an operator and is recorded on a SIM card (UIM card/USIM card). A SIM card is sometimes called a UICC (Universal Integrated Circuit Card).

Resume ID is an ID included in an RRC connection release message which is received by the UE 100 from the eNB 200. Upon receiving an RRC connection release message including the Resume ID from the eNB 200, the UE 100 transitions to a suspend state, which is a sub-state of the RRC idle mode. Subsequently, the UE 100 transmits Msg3 including the Resume ID to the eNB 200 when performing a random access procedure.

The S-TMSI (Serving Temporary Mobile Subscriber Identity) is an identifier that is allocated to the UE 100 by the MME at registration of the position of the UE 100.

The AC is a priority identifier recorded on a SIM card. AC is defined as "0" to "15", where "0" through "9" are allocated to general UEs, "10" is used in an emergency alert, and "11" to "15" are allocated to specific-purpose UEs such as for public institutions. When the AC is used as the identifier, it is assumed that any one of "0" to "9" is used. Note that an AC of "11" to "15" may be used as the identifier.

The controller 130 of the UE 100 determines at least one of a hyper-system frame number (H-SFN), a system frame number (SFN) and a subframe number as the timing of making a connection request in the timing distribution processing. In other words, the controller 130 of the UE 100 may determine all or any two or one of a hyper-system frame number (H-SFN), a system frame number (SFN) and a subframe number according to equations described later. A system frame (radio frame) is a time frame consisting of 10 subframes, while a hyper-system frame is a time frame consisting of 1024 radio frames.

When determining an H-SFN as the timing of making a connection request, the controller 130 of the UE 100 may determine an H-SFN as the timing of making a connection request according to one of equations (1) to (4) below. For example, the controller 130 of the UE 100 determines an H-SFN that satisfies a specific equation as the timing of making a connection request. Alternatively, the controller 130 of the UE 100 may recognize that an H-SFN that satisfies a specific equation as a timing at which making of a connection request is prohibited and determine the timing of making a connection request from timings other than that timing.

$$\text{H-SFN mod } M = \text{IMSI mod } N \tag{1}$$

$$\text{H-SFN mod } M = \text{AC mod } N \tag{2}$$

$$\text{H-SFN mod } M = \text{Resume ID mod } N \tag{3}$$

$$\text{H-SFN mod } M = \text{S-TMSI mod } N \tag{4}$$

Here, "M", "N" may be values that are preconfigured in the UE 100, values that are broadcast by the eNB 200 via an SIB, or values that are configured for the UE 100 by the eNB 200 via individual signaling before the UE 100 transitions to the RRC idle mode. The same applies to the "M", "N" hereinbelow.

Use of "M", "N" enables a variable range. For example, while the H-SFN has a range of from 0 to 1023, "mod 10" can limit it to a range of 0 to 9. This makes it possible to control to which extent (value space) UEs 100 are to be distributed. Then, through configuration of "M", "N" by the eNB 200, access distribution for UEs 100 can be controlled in accordance with load status of the cell.

Note that "M", "N" may be configured for each AC or be configured for each CE level. For example, a list defining "M", "N" for each AC or CE level is preconfigured in the UE 100. Alternatively, such a list may be indicated from the eNB 200 to the UE 100 via broadcast or individual signaling. The UE 100 extracts and uses "M", "N" that correspond to the AC or CE level of the UE 100 from the list.

"M", "N" may also be defined differently as values used for determining the H-SFN and as values used for determining the SFN and Subframe described later.

Although equations (1) to (4) illustrate an example of using the identifier allocated to the UE 100 in its original form, only a predefined portion (e.g., several upper bits or several lower bits) of the identifier allocated to the UE 100 may be extracted and used.

When determining an SFN as the timing of making a connection request, the controller 130 of the UE 100 may determine the timing of making a connection request (SFN) using equation (5) below. Alternatively, the SFN may be determined as the timing of making a connection request using one of equations (2) to (4) by reading H-SFN in equations (2) to (4) as SFN.

$$\text{SFN mod } M = \text{IMSI mod } N \qquad (5)$$

When determining a subframe number (Subframe #) as the timing of making a connection request, the controller 130 of the UE 100 may determine the timing of making a connection request (Subframe #) using equation (6) below. Alternatively, Subframe # may be determined as the timing of making a connection request using one of equations (2) to (4) by reading H-SFN in equations (2) to (4) as Subframe #.

$$\text{Subframe \# mod } M = \text{IMSI mod } N \qquad (6)$$

However, where the connection request signal is a random access preamble, it is possible that a PRACH resource has not been allocated to the subframe of the Subframe # determined by the above equation. Thus, the controller 130 of the UE 100 may determine a subframe number (Subframe #) at which a connection request is to be made only with respect to subframes to which the PRACH resource has been allocated.

The controller 130 of the UE 100 may determine the H-SFN (determination 1) as the timing of making a connection request using the identifier allocated to the UE 100 and then determine the SFN (determination 2) as the timing of making a connection request using the identifier allocated to the UE 100. The controller 130 of the UE 100 may also determine the SFN (determination 1) as the timing of making a connection request using the identifier allocated to the UE 100 and then determine the subframe number (determination 2) as the timing of making a connection request using the identifier allocated to the UE 100. Here, the identifiers used in determination 1 and determination 2 respectively may be different from each other. For example, the controller 130 of the UE 100 may determine the H-SFN using the IMSI and then determine the SFN or subframe number therein by using the AC.

In the present embodiment, the controller 130 of the UE 100 determines the timing of making a connection request to the eNB 200 using the identifier allocated to the UE 100 even if the eNB 200 does not broadcast access restriction information which restricts a connection request to the eNB 200 (i.e., if the receiver 110 of the UE 100 has not received access restriction information). In other words, the UE 100 performs the timing distribution processing also when the eNB 200 managing the cell in which the UE 100 exists is not performing access restriction.

General access restriction is started with broadcasting of the access restriction information by the eNB 200 when the load of the eNB 200 is high, and the access restriction is valid while the access restriction information is being broadcast.

Even when the load of the eNB 200 is not high, however, load caused by transmission and reception of connection request signals (the load of the eNB 200 in particular) jumps if a large number of UEs for machine type communication make connection requests at a time. It is also difficult for the eNB 200 to predict the timing at which a large number of UEs for machine type communication make connection requests at a time.

In the present embodiment, an abrupt increase in load caused by transmission and reception of connection request signals can be avoided through autonomous performance of the timing distribution processing by those UEs 100 that satisfy a certain condition.

The present embodiment can reduce overlaps of transmissions among multiple UEs and ensure that UEs can get an opportunity to make a connection request compared to the existing access restriction with random numbers.

A condition to perform the timing distribution processing is described. The controller 130 of the UE 100 determines whether the condition to perform the timing distribution processing is satisfied or not when there is a need to start communication with the eNB 200 while the UE 100 is in the RRC idle mode, and performs the timing distribution processing only if the condition to perform the timing distribution processing is satisfied.

The condition to perform the timing distribution processing may include a condition that the communication performed by the UE 100 is communication that permits delay (Delay Tolerant Communication). The controller 130 of the UE 100 determines whether a predetermined condition indicating that the communication performed by the UE 100 is communication that permits delay (Delay Tolerant Communication) is satisfied or not, and performs the timing distribution processing when the predetermined condition is determined to be satisfied. Here, the predetermined condition may be that a type of an application executed by the UE 100 is a predetermined type or that QoS (Quality of Service) required by the application executed by the UE 100 is QoS of a predetermined level (or higher). Alternatively, the predetermined condition may be that eDRX (extended Discontinuous Reception) is configured in the UE 100. The eDRX is configured in the UE 100 via MME. A UE 100 with the eDRX configured via MME can be regarded as a UE 100 that performs Delay Tolerant Communication.

The condition to perform the timing distribution processing may include a condition that a terminal category of the UE 100 (UE category) is a predetermined category for machine type communication. The controller 130 of the UE 100 may determine whether the terminal category of the UE 100 (UE category) is a predetermined category for machine type communication or not and perform the timing distribution processing when the terminal category is the predetermined category. The predetermined category may be category M1 or category NB-IoT (category NB1).

The condition to perform the timing distribution processing may include a condition that the UE 100 has received an explicit or implicit predetermined indication from the eNB 200. For example, the controller 130 of the UE 100 receives a paging message addressed to the UE 100 from the eNB 200 and performs the timing distribution processing when a predetermined information element (indication) is included in the paging message. The controller 130 of the UE 100 may determine the timing of making a connection request to the eNB 200 using the identifier allocated to the UE 100 when "M", "N", described above, or a predetermined information element (indication) is broadcast from the eNB 200. Alternatively, the controller 130 of the UE 100 may perform the timing distribution processing if the UE 100 has received individual signaling (e.g., an RRC Connection Release message) including a predetermined information element (indication) from the eNB 200 before the UE 100 transitions to the RRC idle mode.

The eNB 200 may transmit a paging message including the predetermined information element (indication) only once if the UE 100 is made to perform the timing distribution processing in a first period. When making the UE 100 perform the timing distribution processing in a second period longer than the first period, on the other hand, the eNB 200 may transmit a system information block (SIB) including the predetermined information element (indication) multiple times. In other words, a paging message is used when the UE 100 is made to perform the timing distribution processing temporarily and an SIB is used when the UE 100 is made to perform the timing distribution processing for a certain length of time. Note that the eNB 200 does not transmit either of a paging message including the predetermined information element (indication) or an SIB including the predetermined information element (indication) when the UE 100 is not made to perform the timing distribution processing.

The condition to perform the timing distribution processing may include a condition that a CE level of the UE 100 is a predetermined CE level. For example, the controller 130 of the UE 100 compares a reception power of a reference signal (RSRP) received by the UE 100 from the eNB 200 with one or more thresholds and performs the timing distribution processing in accordance with a result of comparison of the reception power with the one or more thresholds. The thresholds are thresholds defining the CE level. Specifically, the controller 130 of the UE 100 determines the CE level of the UE 100 in accordance with the result of comparison of the reception power with the threshold(s) and performs the timing distribution processing if the CE level of the UE 100 is the predetermined CE level. The predetermined CE level may be preconfigured in the UE 100 or may be indicated by the eNB 200 to UE 100.

Figure 8:
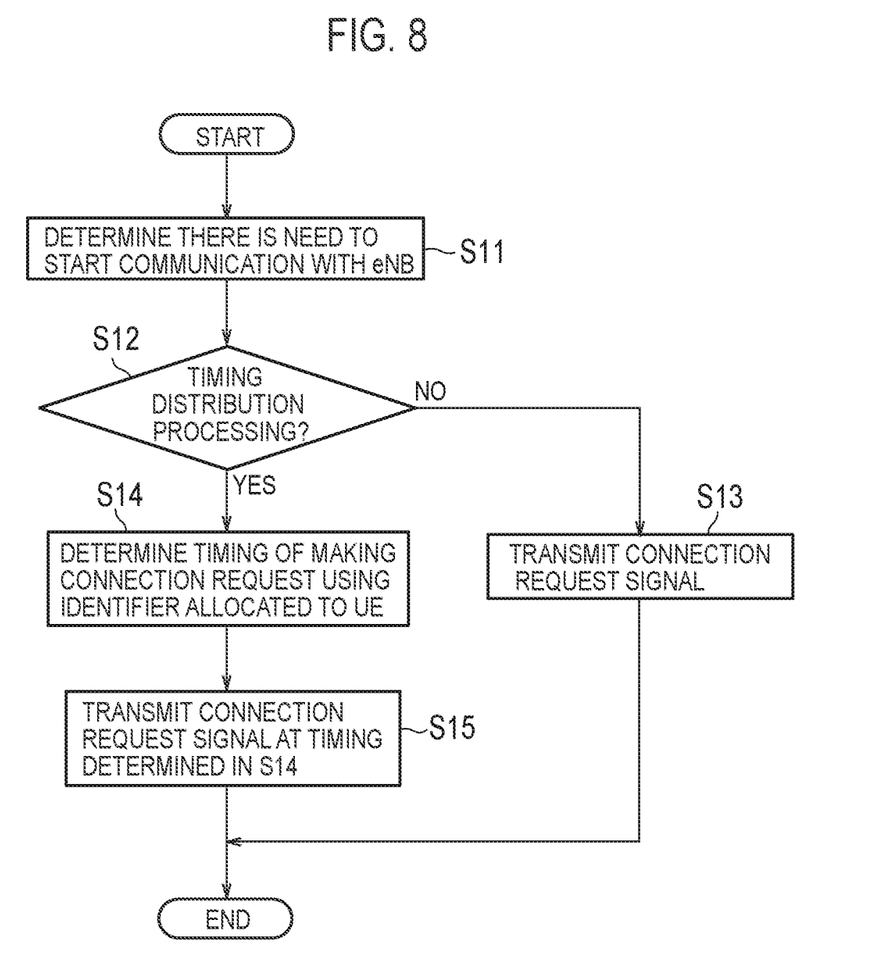
FIG. 8 is a diagram illustrating an flow chart indicating an operation example of an UE according to the embodiment.

FIG. 8 is a flow diagram illustrating an operation example for the UE 100 according to the present embodiment. This flow is executed by the UE 100 in the RRC idle mode.

As illustrated in FIG. 8, in step S11, the controller 130 of the UE 100 determines that there is a need to start communication with the eNB 200 in response to generation of data to be transmitted to the eNB 200.

In step S12, the controller 130 of the UE 100 determines whether to perform the timing distribution processing or not. Specifically, the controller 130 of the UE 100 determines whether the condition to perform the timing distribution processing is satisfied or not.

If the condition to perform the timing distribution processing is not satisfied (step S12: NO), then in step S13 the controller 130 of the UE 100 controls the transmitter 120 to transmit a connection request signal to the eNB 200 at a timing determined in a conventional manner.

If the condition to perform the timing distribution processing is satisfied (step S12: YES), then in step S14 the controller 130 of the UE 100 performs the timing distribution processing. The controller 130 of the UE 100 uses the identifier allocated to the UE 100 to determine the timing of making a connection request to the eNB 200 so that connection request timings at multiple UEs are distributed. Note that the timing distribution processing as referred to herein means the timing distribution processing discussed above or the timing distribution processing discussed later. In step S15, the transmitter 120 of the UE 100 transmits a connection request signal to the eNB 200 at the timing determined in step S14.

OTHER EMBODIMENTS

In the above embodiment, the controller 130 of the UE 100 determines the connection request timing using the identifier allocated to the UE 100 in the timing distribution processing; however, a random number may be used instead of the identifier allocated to the UE 100. For example, the controller 130 of the UE 100 may generate a random number and determine the timing of making a connection request to the eNB 200 in accordance with a result of comparison of the random number with thresholds. For example, the controller 130 of the UE 100 determines whether M (a random number)<N is satisfied or not for each candidate timing at which to make a connection request and determines a candidate timing for which M (a random number)<N is satisfied as the timing of making a connection request to the eNB 200. Note that "M", "N" as referred to herein may be the same as the "M", "N" that were used for determining the connection request timing using the aforementioned identifier.

Alternatively, the eNB 200 may configure candidate timings for the connection request timing for each UE individually. For example, before the UE 100 transitions to the RRC idle mode, the eNB 200 configures candidate timings for the connection request timing for the UE 100 via an RRC Connection Release message, an RRC Connection Reject message or the like. Here, a candidate timing may be at least one of a hyper-system frame number (H-SFN), a system frame number (SFN) and a subframe number. The UE 100 determines the connection request timing from candidate timings configured by the eNB 200 and transmits a connection request signal to the eNB 200 at the determined timing.

In the above-described embodiment, an example where the standby state is the RRC idle mode (specifically, suspend state) and the connected state is the RRC connected mode is described, but the present embodiment is not limited thereto. The connected state may be RRC light connection and the standby state may be INACTIVE state. The RRC light connection is one state of the RRC connected mode, and is a special state to which a part of the procedure of the RRC idle mode is applied. The INACTIVE is assumed to be introduced in the 5G mobile communication system, and is an RRC state different from the RRC connected mode and the RRC idle mode.

In the foregoing embodiments, an LTE system was illustrated as a mobile communications system. However, the present disclosure is not limited to an LTE system. The operations according to the foregoing embodiments may also be applied to a mobile communications system other than an LTE system (to a 5G mobile communications system, for example).

A program that causes a computer to execute each process executed by the UE 100 and the eNB 200 may also be provided. Furthermore, the program may also be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example. A chip set configured by a memory that stores a program for executing each process implemented by the UE 100 and eNB 200 and a processor that executes the program stored in the memory may also be provided.

Although the embodiments have been described in detail with reference to the drawings, the specific configuration is not limited to the above, and various design changes and the like can be made without departing from the gist.

The invention claimed is:

1. A radio terminal configured to perform communication with a base station, the radio terminal comprising:
   a controller configured to determine a timing of making a connection request to the base station when there is a need to start communication with the base station while the radio terminal is in a standby state; and
   a transmitter configured to transmit a connection request signal to the base station at the determined timing,
   wherein the controller is configured to
   determine the timing using an identifier for identifying the radio terminal,
   determine whether a predetermined condition indicating that communication performed by the radio terminal is communication that permits delay is satisfied or not, and
   determine the timing using the identifier when determining that the predetermined condition is satisfied.

2. The radio terminal according to claim 1, wherein the connection request signal is random access preamble or RRC Connection Request Message.

3. The radio terminal according to claim 1, wherein the controller is configured to determine, as the timing of making a connection request, at least one of a hyper-system frame number, a system frame number and a subframe number.

4. The radio terminal according to claim 1, wherein the controller is configured to determine the timing using the identifier even when the base station does not broadcast access restriction information which restricts a connection request from the radio terminal to the base station.

5. The radio terminal according to claim 1, wherein the predetermined condition includes a condition that the communication performed by the radio terminal is Delay Tolerant Communication.

6. The radio terminal according to claim 1, wherein the predetermined condition includes a condition that the radio terminal has received a predetermined indication from the base station, wherein the indication is included in a paging message which is addressed to the radio terminal, or in an RRC Connection Release message.

7. The radio terminal according to claim 1, wherein the predetermined condition includes a condition that a system information block broadcast from the base station is includes a value for determining the timing.

8. The radio terminal according to claim 1, wherein the predetermined condition includes a condition that a CE level of the radio terminal is a predetermined CE level.

9. The radio terminal according to claim 1, wherein the controller is configured to:
   determine whether a terminal category of the radio terminal is a predetermined category for machine type communication or not, and
   determine the timing using the identifier when the terminal category is the predetermined category.

10. The radio terminal according to claim 1, wherein the controller is configured to:
    compare a reception power of a reference signal received by the radio terminal from the base station with one or more thresholds, and
    determine the timing using the identifier in response to a result of comparison of the reception power with the one or more thresholds.

11. The radio terminal according to claim 1, wherein the identifier is used for distributing connection request timings at a plurality of radio terminals including the radio terminal.

12. A method in a radio terminal configured to perform communication with a base station, the method comprising:
    determining a timing of making a connection request to the base station when there is a need to start communication with the base station while the radio terminal is in a standby state; and
    transmitting a connection request signal to the base station at the determined timing,
    wherein the determining the timing includes
        determining the timing using an identifier for identifying the radio terminal,
        determining whether a predetermined condition indicating that communication performed by the radio terminal is communication that permits delay is satisfied or not, and
        determining the timing using the identifier when determining that the predetermined condition is satisfied.

13. A processor controlling a radio terminal configured to perform communication with a base station, the processor configured to execute:
    a process of determining a timing of making a connection request to the base station when there is a need to start communication with the base station while the radio terminal is in a standby state; and
    a process of transmitting a connection request signal to the base station at the determined timing,
    wherein the process of determining the timing includes
    a process of determining the timing using an identifier for identifying the radio terminal,
    a process of determining whether a predetermined condition indicating that communication performed by the radio terminal is communication that permits delay is satisfied or not, and
    a process of determining the timing using the identifier when determining that the predetermined condition is satisfied.

* * * * *